US012250505B2

(12) United States Patent
Li et al.

(10) Patent No.: US 12,250,505 B2
(45) Date of Patent: Mar. 11, 2025

(54) ACOUSTIC DEVICE AND PRODUCTION METHOD FOR PROTECTION COMPONENTS THEREOF

(71) Applicant: SHENZHEN SHOKZ CO., LTD., Guangdong (CN)

(72) Inventors: Chaowu Li, Shenzhen (CN); Shuailin Xie, Shenzhen (CN); Junjiang Fu, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 186 days.

(21) Appl. No.: 18/045,156

(22) Filed: Oct. 8, 2022

(65) Prior Publication Data

US 2023/0068430 A1 Mar. 2, 2023

Related U.S. Application Data

(63) Continuation of application No. PCT/CN2021/091115, filed on Apr. 29, 2021.

(30) Foreign Application Priority Data

Aug. 12, 2020 (CN) ......................... 202010808757.7
Aug. 12, 2020 (CN) ......................... 202021688900.9

(51) Int. Cl.
*H04R 1/02* (2006.01)
*H04R 25/00* (2006.01)

(52) U.S. Cl.
CPC ............. *H04R 1/023* (2013.01); *H04R 25/65* (2013.01)

(58) Field of Classification Search
CPC ...... H04R 1/023; H04R 25/65; H04R 1/1008; H04R 25/606; H04R 31/00;
(Continued)

(56) References Cited

U.S. PATENT DOCUMENTS 4,430,529 A * 2/1984 Nakagawa ............. H04R 17/00 310/326
5,514,927 A * 5/1996 Tichy ................ H10N 30/2047 310/330
(Continued)

FOREIGN PATENT DOCUMENTS

CN 202713590 U 1/2013
CN 205336486 U 6/2016
(Continued)

OTHER PUBLICATIONS

First Office Action in Russian Application No. 2022127232 mailed on May 29, 2023, 14 pages.
(Continued)

*Primary Examiner* — Angelica M McKinney
(74) *Attorney, Agent, or Firm* — METIS IP LLC

(57) ABSTRACT

The present disclosure discloses an acoustic device, including: one or more shells each of which includes an accommodation cavity and an opening; one or more speakers each of which includes a vibration component placed in the accommodation cavity; one or more protection components configured to prevent a foreign body from entering the accommodation cavity through the opening, and at least a portion of one of the one or more protection components may be physically connected with the vibration component to transmit a vibration of the vibration component to the outside.

20 Claims, 11 Drawing Sheets

(58) Field of Classification Search
CPC ............ H04R 2420/07; H04R 2460/13; H04R 1/1075; H04R 25/604; H04R 1/10; H04R 9/066; H04R 17/00; H04R 1/1091; H04R 9/02; H04R 1/02; B29B 11/04; H10N 30/2047; F04D 29/70; B41M 1/12
See application file for complete search history.

(56) References Cited

U.S. PATENT DOCUMENTS

| | | | | |
|---|---|---|---|---|
| 8,447,061 | B2 * | 5/2013 | Lee | H04R 1/1091 381/181 |
| 2009/0285417 | A1 * | 11/2009 | Shin | H04R 9/06 381/151 |
| 2011/0243367 | A1 * | 10/2011 | Lee | H04R 9/066 381/398 |
| 2011/0249858 | A1 * | 10/2011 | Lee | H04R 9/066 381/398 |
| 2011/0274308 | A1 * | 11/2011 | Doh | H04R 9/06 381/398 |
| 2013/0094689 | A1 | 4/2013 | Tanaka et al. | |
| 2014/0355777 | A1 | 12/2014 | Nabata et al. | |
| 2016/0050477 | A1 | 2/2016 | Ushakov | |
| 2016/0088385 | A1 * | 3/2016 | Fan | B29B 11/04 29/896.2 |
| 2016/0119721 | A1 * | 4/2016 | Doshida | H04R 17/00 381/190 |
| 2016/0157020 | A1 * | 6/2016 | Ishii | H04R 1/1075 381/190 |
| 2016/0248894 | A1 * | 8/2016 | Hosoi | H04M 1/05 |
| 2018/0270555 | A1 | 9/2018 | Mao et al. | |
| 2019/0014425 | A1 * | 1/2019 | Liao | H04R 9/066 |
| 2019/0124427 | A1 | 4/2019 | Lucignano et al. | |
| 2019/0174233 | A1 | 6/2019 | Fukuda | |

FOREIGN PATENT DOCUMENTS

| | | | | | |
|---|---|---|---|---|---|
| CN | 209875578 | U | * | 12/2019 | F04D 29/70 |
| CN | 110650385 | A | * | 1/2020 | H04R 1/02 |
| CN | 110708642 | A | * | 1/2020 | H04R 9/02 |
| CN | 112087700 | A | | 12/2020 | |
| CN | 212851007 | U | | 3/2021 | |
| CN | 212851008 | U | | 3/2021 | |
| CN | 213342682 | U | | 6/2021 | |
| EP | 2453676 | A1 | | 5/2012 | |
| EP | 3337185 | A1 | | 6/2018 | |
| JP | 2001292489 | A | | 10/2001 | |
| JP | 2008124630 | A | | 5/2008 | |
| JP | 2019129524 | A | | 8/2019 | |
| KR | 100956693 | B1 | * | 5/2010 | H04R 9/02 |
| WO | WO-2011101933 | A1 | * | 8/2011 | B41M 1/12 |

OTHER PUBLICATIONS

Notice of Reasons for Rejection in Japanese Application No. 2022569604 mailed on Jan. 9, 2024, 6 pages.

International Search Report in PCT/CN2021/091115 mailed on Jul. 29, 2021, 7 pages.

The Extended European Search Report in European Application No. 21855137.2 mailed on Sep. 27, 2023, 11 pages.

* cited by examiner

ACOUSTIC DEVICE AND PRODUCTION METHOD FOR PROTECTION COMPONENTS THEREOF

CROSS-REFERENCE TO RELATED APPLICATION

This application is a continuation of International Application No. PCT/CN2021/091115 filed on Apr. 29, 2021, which claims priority of Chinese Patent Application No. 202021688900.7, and Chinese Patent Application No. 202010808757.9, filed on Aug. 12, 2020, the contents of each of which are entirely incorporated herein by reference.

TECHNICAL FIELD

The present disclosure involves a technical field of a bone conduction device, and in particular, an acoustic device and a method for producing a protection component of the acoustic device.

BACKGROUND

A hearing aid is a kind of small speaker that amplifies an originally inaudible sound, and then with a residual hearing of a hearing impaired, the sound may be sent to the brain auditory center. However, due to a damage or degeneration of the hearing of the hearing impaired, the traditional ear canal transmission of the sound has a limited improvement on auditory effect of the hearing impaired. Therefore, it is hoped to provide an acoustic device with a better structural component and structural layout to better improve the auditory effect of the hearing impaired.

SUMMARY

The embodiments of the present disclosure provides an acoustic device, including: one or more shells, each of which includes an accommodation cavity and an opening; one or more speakers, each of which includes a vibration component accommodated in the accommodation cavity; and one or more protection components used to prevent a foreign body from entering the accommodation cavity through the opening, at least a portion of each of the one or more protection components is physically connected with the vibration component to transmit a vibration of the vibration component to the outside.

In some embodiments, at least a portion of the vibration component extends out of the accommodation cavity through the opening.

In some embodiments, at least one of the one or more protection components includes a mesh structure with meshes to make the accommodation cavity communicate with the outside.

In some embodiments, at least one of the one or more protection components includes a first portion and a second portion, the first portion and the second portion form an accommodation portion, at least a portion of the vibration component may be arranged in the accommodation portion; the first portion may be configured to seal one end of the accommodation portion, and the first portion fits an end surface of the vibration component facing the opening.

In some embodiments, the second portion may be physically connected with an end of each of the one or more shells with the opening.

In some embodiments, an inner wall of each of the one or more shells may be arranged with a bearing platform, and the second portion may be supported on the bearing platform.

In some embodiments, the acoustic device further includes an upper cover, and at least a portion of the second portion may be clamped between the upper cover and the bearing platform to press the second portion on the bearing platform.

In some embodiments, at least a portion of an outer surface of the second portion fits the upper cover, and at least a portion of an inner surface of the second portion fits the bearing platform.

In some embodiments, the second portion includes a ring wall portion and a supporting portion, the ring wall portion connects the first portion and extends toward the vibration component; the supporting portion extends from the ring wall portion to between the upper cover and the bearing platform.

In some embodiments, the upper cover includes a first body and a second body arranged in layers, and at least a portion of the second portion may be clamped between the first body and the second body.

In some embodiments, each of the one or more protection components includes a mesh structure with meshes, and a mesh number of the mesh structure may be 250-600.

In some embodiments, each of the one or more the protection components includes a mesh structure with meshes, and a thickness of the mesh structure is 0.01 mm-0.3 mm.

In some embodiments, a count of the one or more shells, a count of the one or more speakers, and a count of the one or more protection components may be two, each of the shells corresponds to one of the speakers and one of the protection components. The acoustic device further includes two ear hook components and a rear hook component, the two ear hook components respectively connect with the two shells; and the rear hook component may be connected between the two ear hook components.

In some embodiments, the acoustic device includes a pickup component used to obtain a sound signal; and the pickup component may be arranged on at least one of the one or more speakers, the two ear hook components, and the rear hook component.

The embodiment of the present disclosure further provides a method for preparing the one or more protection components of the acoustic device, which includes the following operations: forming a combination by fitting a mesh structure and a lining material, wherein a hardness of the lining material is greater than a hardness of the mesh structure; obtaining a shaped combination by shaping the combination using a molding technique; and obtaining the one or more protection components based on the shaped combination.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
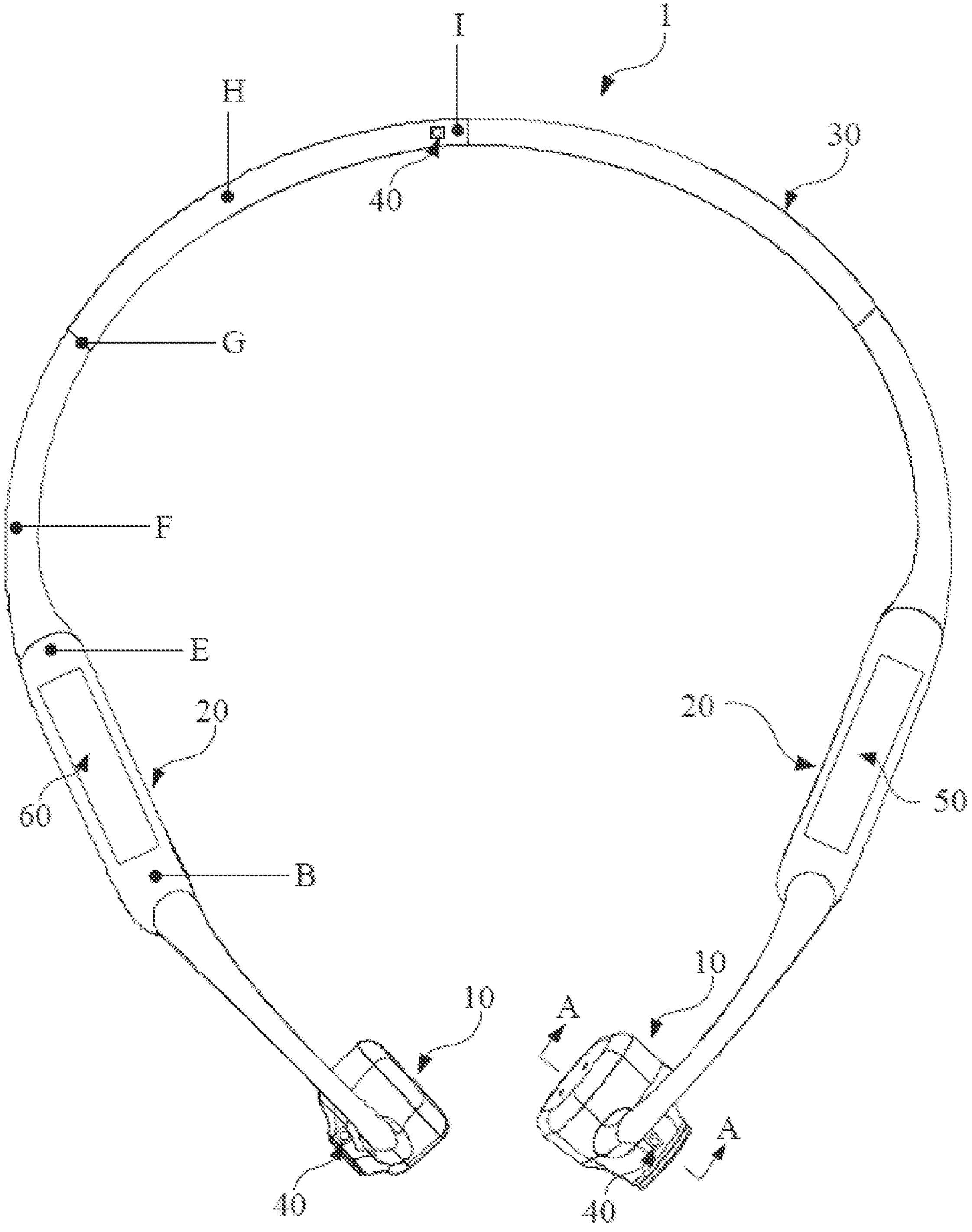
FIG. 1 is a structural diagram illustrating an acoustic device according to some embodiments in the present disclosure.

In order to illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obvious according to the context or illustrated specifically, the same numeral in the drawings refers to the same structure or operation.

It should be understood that the position relations indicated by terms “center”, “upper surface”, “lower surface”, “above”, “below”, “top”, “bottom”, “inside”, “outside”, “axial direction”, “radial direction”, “peripheral”, “external” are position relations based on those shown in the attached drawings, which do not indicate that the devices, the component, or the units must have a specific position relation, and should not be taken as a limit for the present disclosure.

As used in the disclosure and the appended claims, the singular forms “a,” “an,” and “the” include plural referents unless the content clearly dictates otherwise. Generally speaking, the terms “include” and “include” only indicate include the operations and elements that have been clearly identified, and these operations and elements do not constitute an exclusive list. The methods or devices may also include other operations or elements.

Based on the attached drawings and the embodiments, the present disclosure is further described in detail. In particular, the following examples are only used to illustrate the present disclosure, but the scope of this the present disclosure is not limited. Similarly, the following embodiments are only portion of the embodiments of the present disclosure. All other embodiments obtained by those skilled in the art under the premise of no creative labor are within the protection scope of the present disclosure.

In the present disclosure, the “embodiment” means that the specific features, structures, or features described in combination of the embodiments may be included in at least one embodiment of the present disclosure. Those skilled in the art may clearly and implicitly understand that the embodiments described in the present disclosure may be combined with other embodiments.

Based on the attached drawings of the embodiments, the technical solutions in the embodiments of the present disclosure may be clearly and fully described as follow. Obviously, the embodiments described are only a portion of the embodiments of the present disclosure instead of all embodiments. Based on the embodiments in the present disclosure, all other embodiments obtained by those skilled in the art under the premise of no creative labor are within the protection scope of the present disclosure.

In the present disclosure, an acoustic device may be a hearing aid, a listening bracelet, a headset, a speaker, a pair of smart glasses and other devices with acoustic output functions. In some embodiments, an acoustic device 1 may be a bone conduction hearing aid, a bone conduction listening bracelet, a bone conduction headset, a bone conduction speaker, a pair of bone conduction smart glasses and other devices implementing acoustic output based on the bone conduction. In the present disclosure, the acoustic device 1 as a bone conduction hearing aid may be taken as an example for illustration.

The hearing aid is a small speaker that amplifies an originally inaudible sound, and then with a residual hearing of the hearing impaired, the sound may be sent to a brain auditory center. However, due to a damage or degeneration of the hearing of the hearing impaired, the traditional ear canal transmission method has a limited improvement on auditory effect of the hearing impaired. In some embodiments, a bone conduction technology may be applied to the hearing aid. The bone conduction technology may break through the traditional ear canal sound transmission method, and effectively improve the auditory effect of the hearing impaired, and enable the hearing impaired to receive a clearer and more stable sound.

The bone conduction hearing aid may convert audio into a mechanical vibration with different frequencies, use a human bone as a medium that transmits the mechanical vibration, and then transmit the mechanical vibration to a hearing nerve, so that the user may receive the sound without using an external auditory canal and a tympanic membrane. In some embodiments, an application of the bone conduction technology to the hearing aid may effectively improve a defect of a method of sound transmission in the ear canal. For more about the application of the bone conduction technology to the hearing aid, please refer to the exemplary descriptions of the embodiments below.

FIG. 1 is a structural diagram illustrating an acoustic device according to some embodiments in this the present disclosure. As shown in FIG. 1, in some embodiments, an acoustic device 1 may include one or more speakers 10 and one or more ear hook components 20. The one or more ear hook components 20 may be connected with the one or more speakers 10, and the one or more ear hook components 20 may be hung on a user’s ears, so that the one or more speakers 10 may be hung on the user’s ears. In some embodiments, a count of the one or more speakers 10 may be two, the count of the one or more ear hook components 20 may be two, the two speakers 10 and the two ear hook components 20 may be arranged in a one-to-one correspondence. The count of the one or more speakers 10 and the count of the one or more ear hook components 20 may be selected according to an actual usage. For example, when the acoustic device is a bone conduction hearing aid, if the user has hearing loss in one ear, the count of one or more speakers 10 and one or more ear hook components 20 may be one; if the user has hearing loss in both ears, the count of speakers 10 and ear hook components 20 may be two. In some embodiments, the acoustic device may further include a rear hook component 30, and the rear hook component may be connected between the two ear hook components 20, so that the ear hook components 20 may be more stable on the user's ears.

In some embodiments, the acoustic device 1 may include two speakers 10, two ear hook components 20, and a rear hook component 30. One end of the two ear hook components 20 may be connected with one speaker 10, that is, the two ear hook components 20 each connects one speaker 10. The rear hook component 30 connects the other end of the two ear hook components 20 departing from their corresponding speakers 10. In some embodiments, the acoustic device 1 may further include one or more pickup components 40.

The one or more speakers 10 may be configured to transform an audio into a mechanical vibration of different frequencies. When wearing the acoustic device 1, the one or more speakers 10 may be fitted to the user's head near the ears, and then the mechanical vibration may be transmitted to the human auditory system through the bone of the head. The one or more ear hook components 20 may be configured to hang on the ears of the user. In some embodiments, the two ear hook components 20 may be provided with a battery component 50 and a control circuit component 60. The control circuit component 60 may be configured to control an operation of the entire acoustic device 1, such as volume increase and decrease, power on/off, headset mode selection, wireless connection or data transmission, etc. The battery component 50 may be configured to power the entire acoustic device 1.

When wearing the acoustic device 1, the rear hook component 30 may be arranged around the back side of the user's head. The rear hook component 30 may be connected between the other ends of the two ear hook components 20, whose structure is reliable and stable, so that the acoustic device 1 is worn stably.

In some embodiments, the rear hook component 30 may be a rod. In some embodiments, the rear hook component 30 may be an arc to match the shape of the user's head. In some embodiments, the rear hook component 30 may bypass the top or the back of the user's head. In some embodiments, the rear hook component 30 may include a telescopic structure, so that the user may adjust the length of the rear hook component 30 and have a comfortable wear experience.

The pickup component 40 may be arranged in a plurality of positions of the acoustic device. In some embodiments, the pickup component 40 may be arranged on the one or more speakers 10. In some embodiments, the pickup component 40 may be arranged on one of the one or more ear hook components 20. In some embodiments, the pickup component 40 may be arranged on the rear hook component 30. In some embodiments, the pickup component 40 may be arranged on the end of one of the one or more ear hook components 20 away from the one or more speakers 10. Arranging the pickup component 40 on the end of the one of the one or more ear hook components 20 away from the one or more speakers 10 may improve the "howling" situation of the pickup component 40. For details, please refer to the relevant explanations below.

The acoustic device 1 including a plurality of pickup components 40 may be taken as an example for explanation. In some embodiments, the plurality of pickup components 40 may be arranged on at least two of the two speakers 10 and the rear hook component 30. In some other embodiments, the plurality of pickup components 40 may be spaced apart on the rear hook component 30. The plurality of pickup components 40 may be set apart and independent from each other, so that they may independently carry out pickup and signal amplification. It should be explained that the "plurality of" described in the embodiment refers to "at least two", such as "two", "three", "four", etc.

In some embodiments, one of the plurality of pickup components 40 may be arranged on the rear hook component 30, and may be arranged at a middle position of the rear hook component 30. In some embodiments, the middle position of the rear hook component 30 may be a middle point of the rod-shaped rear hook component 30. In some embodiments, at least two pickup components 40 may be arranged on the rear hook component 30, and one of which may be arranged at the middle position of the rear hook component (e.g., the middle point of the rod-shaped rear hook component 30). The remaining pickup component 40 may be arranged on one or two sides of the middle position, and the at least two pickup components 40 may be spaced apart. In some other embodiments, the acoustic device 1 may include three pickup components 40, two of which may be arranged in a one-to-one accordance on the two ear hook components 20, and the other one may be arranged on the rear hook component 30. The above pickup components 40 may be independent with each other, and they may independently perform the pickup and the signal amplification, and may process sounds from different orientations independently, so that the hearing impaired may adapt to sounds from different orientations and an auditory effect of the hearing impaired may be improved.

In some embodiments, the plurality of pickup components 40 may be spaced apart in a length direction of the rear hook component 30. In some embodiments, the distance between the two adjacent pickup components 40 may be equal. In some other embodiments, the distance between any of the two adjacent pickup components 40 may be different.

In some embodiments, to apply the bone conduction technology to a hearing aid headset, the one or more speakers 10 needs to have a good sound conduction effect, which is used to transmit an audio signal in a form of a mechanic vibration. Normally, if there is a great air vibration within the one or more speakers 10, the sound conduction effect of the mechanical vibration of the one or more speakers 10 may be affected, and the sound quality may be reduced, thereby affecting the auditory effect of the hearing impaired. In some embodiments, the one or more speakers 10 may be configured according to the following descriptions of the embodiments of the present disclosure. In some other embodiments, the following one or more speakers 10 may further be applied to other types of bone conduction acoustic devices, which are not limited to the acoustic device 1 described in the present disclosure.

Figure 2:
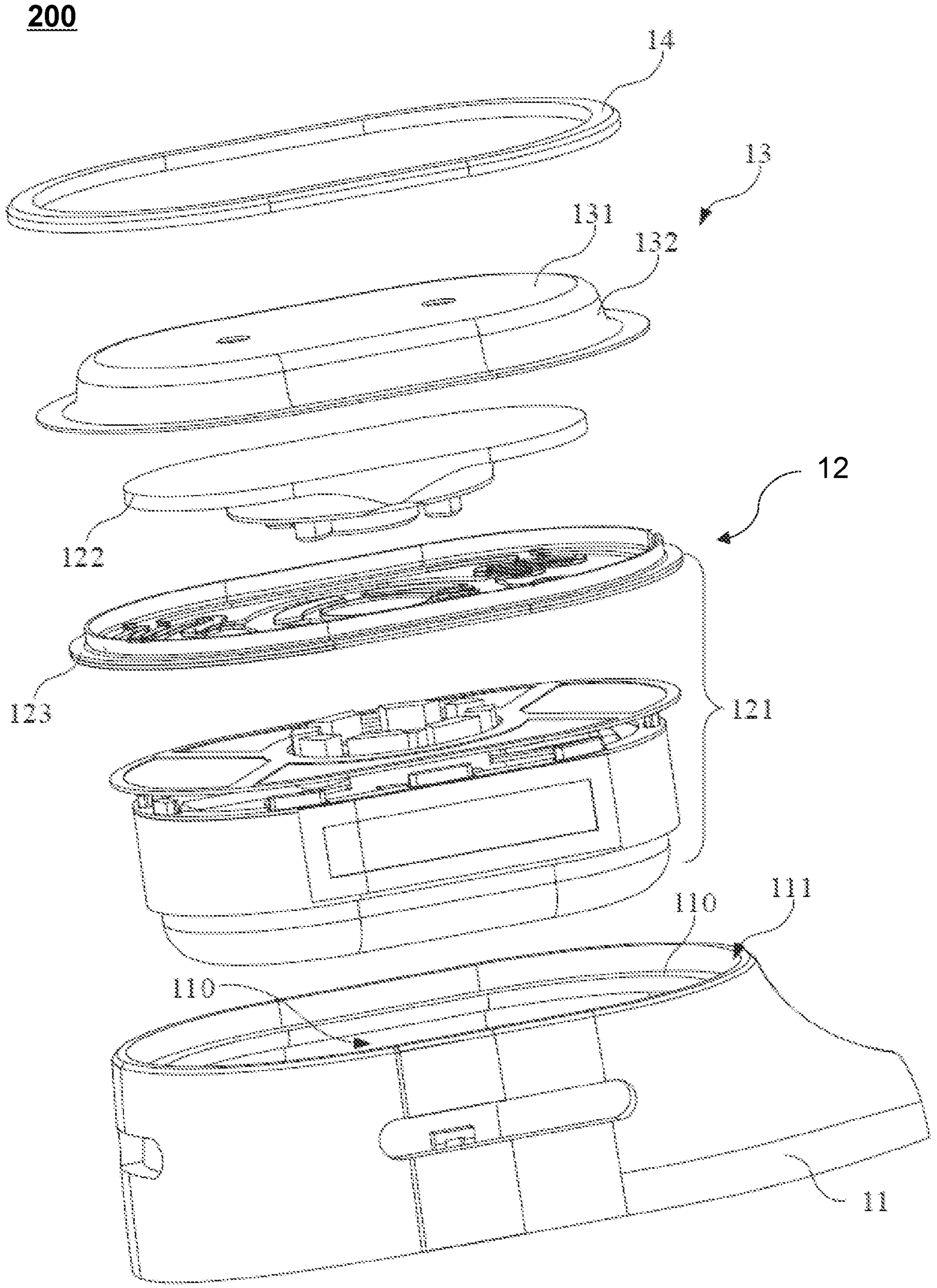
FIG. 2 is a schematic diagram illustrating a disassembled structure of an acoustic device according to some embodiments of the present disclosure.
Figure 3:
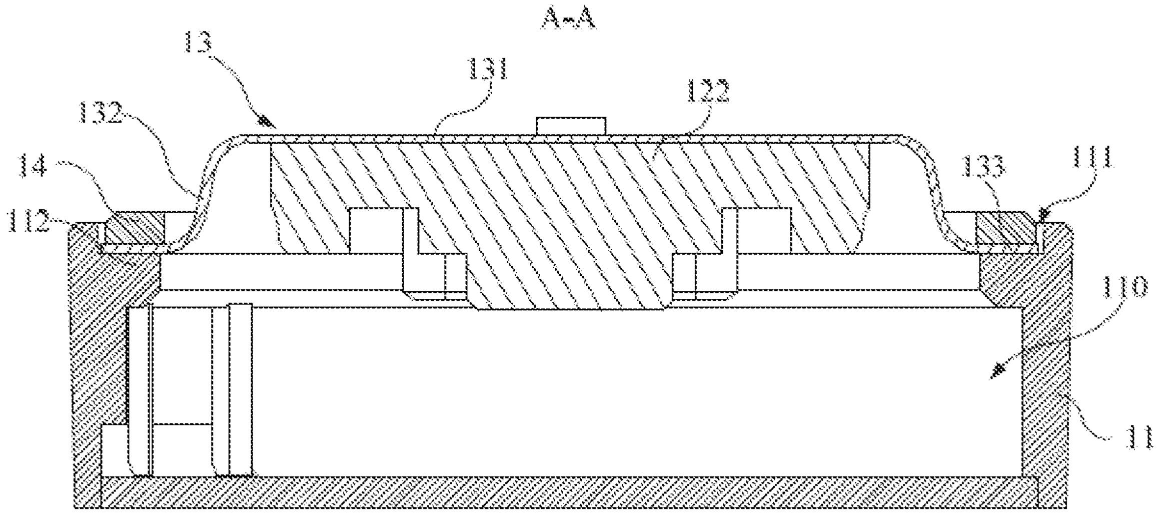
FIG. 3 is a schematic diagram illustrating a cross section of the acoustic device in FIG. 1 along the A-A section line.
Figure 4:
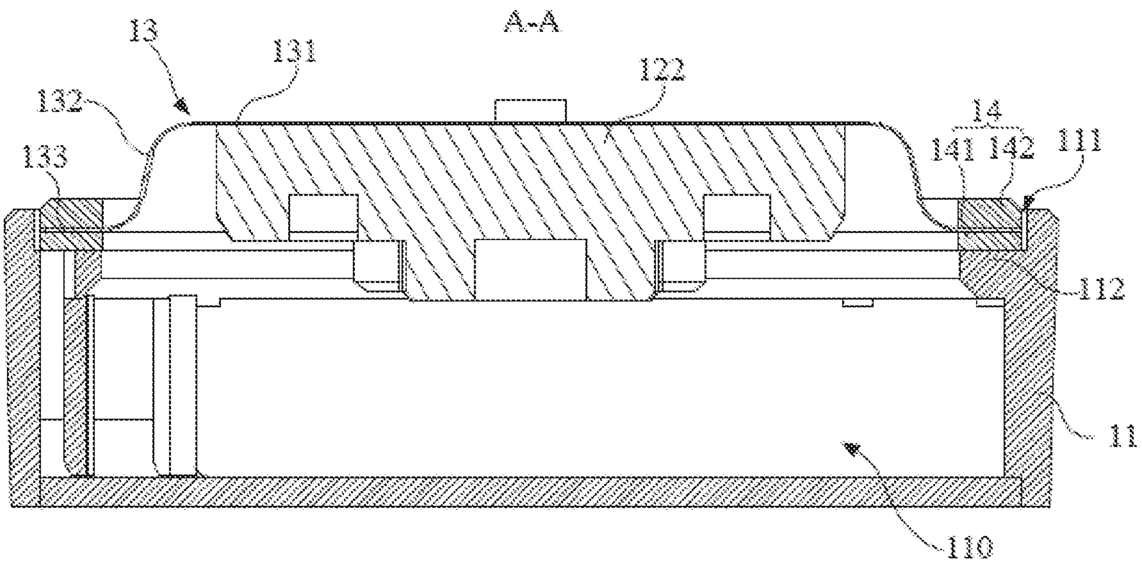
FIG. 4 is a schematic diagram illustrating another cross section of the acoustic device in FIG. 1 along the A-A section line.
Figure 5:
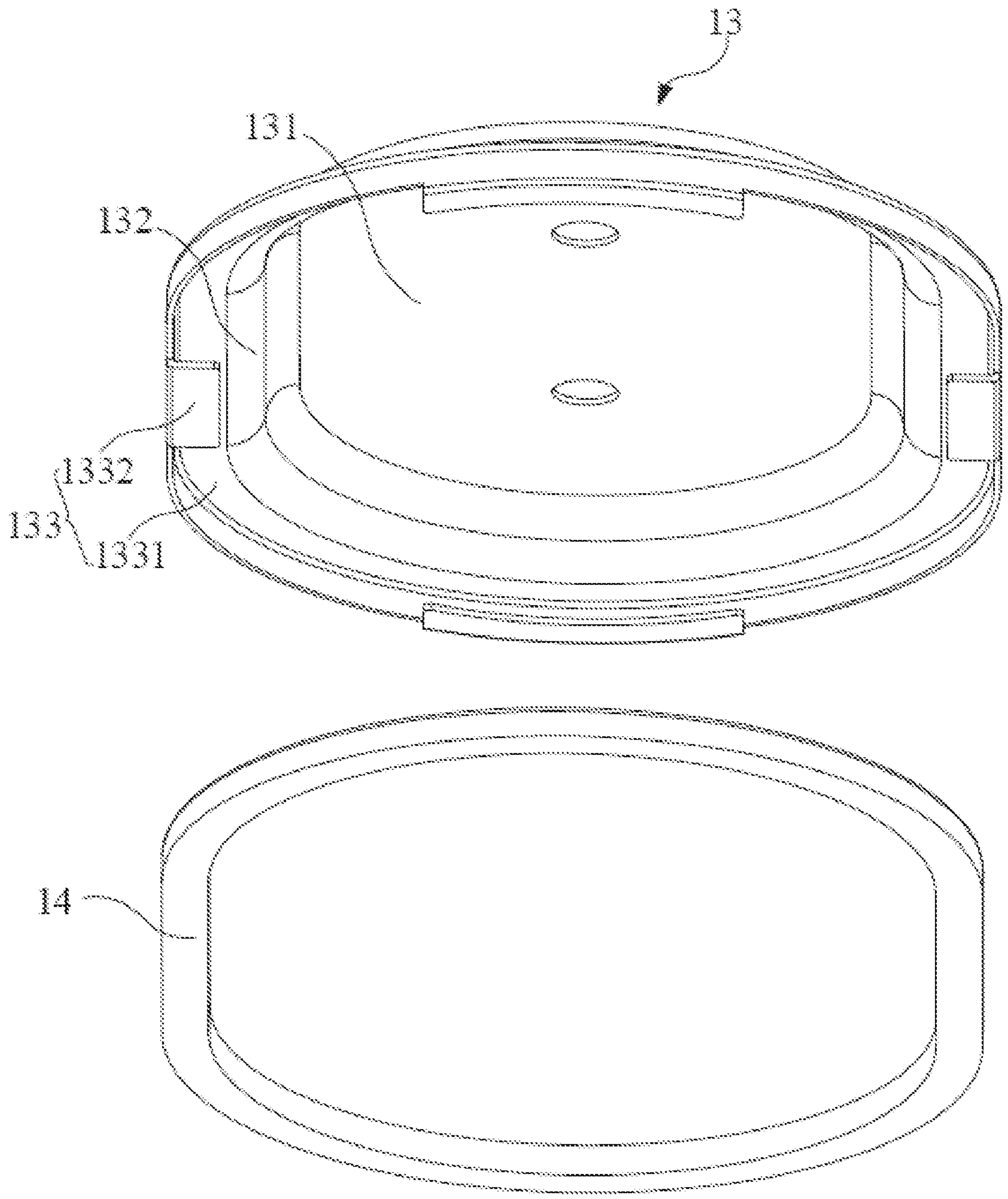
FIG. 5 is a schematic diagram illustrating a disassembled structure of a protection component and an upper cover of an acoustic device in FIG. 4.
Figure 6:
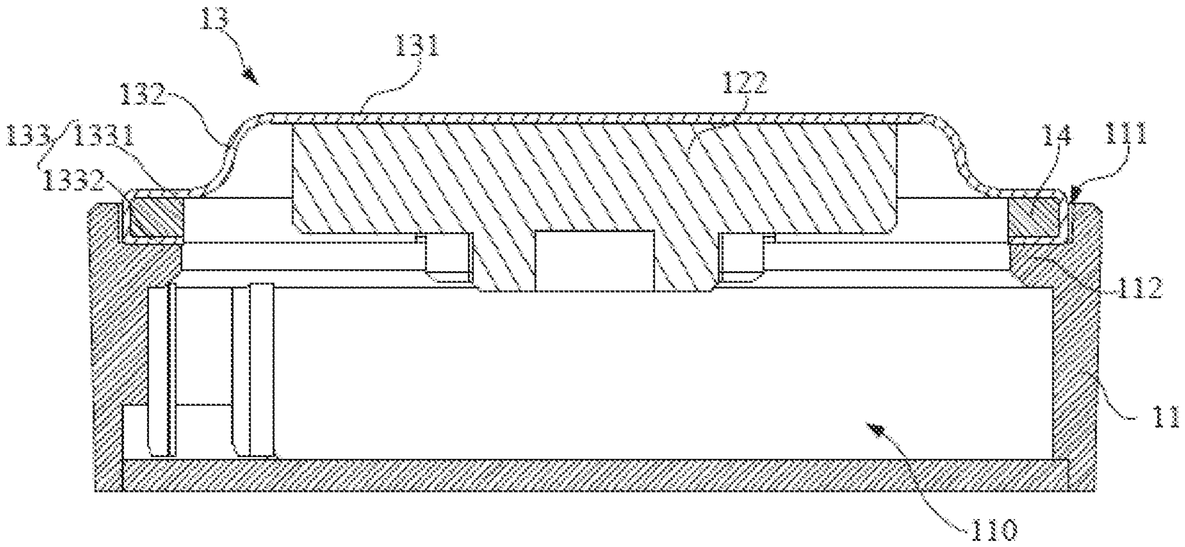
FIG. 6 is a schematic diagram illustrating another cross section of the acoustic device along the A-A section line in FIG. 1.

FIG. 2 is a schematic diagram illustrating a disassembled structure of an acoustic device according to some embodiments of the present disclosure; FIG. 3 is a schematic diagram illustrating a cross section of the acoustic device in FIG. 1 along the A-A section line; FIG. 4 is a schematic diagram illustrating another cross section of the acoustic device in FIG. 1 along the A-A section line; FIG. 5 is a schematic diagram illustrating a disassembled structure of a protection component and an upper cover of an acoustic device in FIG. 4; FIG. 6 is a schematic diagram illustrating another cross section of the acoustic device along the A-A section line in FIG. 1. In some embodiments, the acoustic device described in FIGS. 2-6 may be a specific embodiment of the one or more speakers 10 in FIG. 1.

As shown in FIG. 2 to FIG. 6, in some embodiments, an acoustic device 200 may include one or more shells 11, one or more speakers 12, and one or more protection components 13. The one or more speakers 12 may be bone conduction speakers. The one or more protection components 13 may be mesh structures with meshes. The one or more speakers 12 may be accommodated in the one or more shells 11. The one or more protection components 13 may be supported on the one or more shells 11, which can be used to protect the one or more speakers 12.

As shown in FIG. 2, in some embodiments, each of the one or more shells 11 may have an accommodation cavity 110 and an opening 111. The side of each of the one or more shells 11 with the opening 111 may be used to fit to the user's head. The accommodation cavity 110 may be configured to accommodate the one or more speakers 12. A portion of the each of the one or more speakers 12 may be extended out of the accommodation cavity 110 through the opening 111, so that a mechanical vibration generated by the one or more speakers 12 may be transmitted to the user's head.

In some embodiments, an inner wall of each of the one or more shells 11 may be arranged with a bearing platform 112. In some embodiments, the bearing platform 112 may be a ring. The inner wall of each of the one or more shells 11 refers to the inner wall of each of the one or more shells 11 forming the accommodation cavity 110. The bearing platform 112 may be arranged adjacent to the opening 111. In some embodiments, the bearing platform 112 may be used to support each of the one or more protection components 13. In some embodiments, when the each of the one or more protection components 13 is supported on the bearing platform 112, each of the one or more protection components 13 may cover or roughly cover the opening 111, thereby protecting the one or more speakers 12. In some embodiments, the protection components 13 covering the openings may be understood as the openings 111 are covered by the protection components 13.

In some embodiments, the bearing platform 112 may further be in other shapes. In some embodiments, the bearing platform 112 may include a plurality of protruding structures arranged on the inner wall. The plurality of protruding structures may be spaced apart along a specified direction. For example, when the accommodation cavity 110 is a cylinder, the plurality of protruding structures may be spaced apart along the circumference of the cylinder to form a non-continuous annular bearing platform.

In some embodiments, each of the one or more speakers 12 may include a vibration component 121 and a vibration transmission plate 122. In some embodiments, the vibration component 121 may include a voice coil and a magnetic circuit component (not shown in the figure). In some embodiments, at least a portion of elements of the vibration component 121 may be accommodated within the accommodation cavity 110. For example, the vibration diaphragm of the vibration component 121 may be accommodated within the accommodation cavity. The vibration transmission plate 122 may be connected with the vibration component 121, and exposed at the opening 111. In some embodiments, the vibration transmission plate 122 exposing at the opening 111 may refer to the vibration transmission plate 122 extends through the opening 111 to the outside of the accommodation cavity 110. The one or more speakers 12 may protrude from the inside of the one or more shells 11 to outside, and the vibration transmission plate 122 may extend through the opening 111 to the outside of the accommodation cavity 110 and be exposed. When receiving an audio signal, the one or more vibration components 121 may convert the audio signal into a mechanical vibration and transmit the vibration of the one or more speakers 12 through the vibration transmission plate 122 to a user's bone (such as a skull) and then to a human auditory nerve.

In some embodiments, the one or more speakers 12 may be completely located within the accommodation cavity 110. In some embodiments, the vibration transmission plate 122 may be at the same level with the opening 111 in term of position. In some embodiments, the vibration component 121 may be extended outside of the accommodation cavity 110 through the opening 111.

In some embodiments, the one or more protection components 13 may be arranged at the opening end of each of the shells 11 and may fit the vibration transmission plate 122. For example, the one or more protection components 13 may fit an end of the vibration transmission plate 122 away from the vibration component 121. In some embodiments, as shown in FIGS. 3-4, each of the one or more protection components 13 may include a fitting portion 131 (that is, the first portion of the protection component 13), a ring wall portion 132 and a supporting portion 133 (the ring wall portion 132 and the supporting portion 133 may be the second portion of the protection component 13). In some embodiments, the supporting portion 133 may be a ring. In some embodiments, the fitting portion 131 and the ring wall portion 132 may form a cylindrical accommodation portion. In some embodiments, the vibration transmission plate 122 may be arranged in the cylindrical accommodation portion. The fitting portion 131 may be connected with one end of the ring wall portion 132 to seal one end of the accommodation portion, and the fitting portion 131 may be fitted with an outer end surface (the surface of the end away from the of the vibration component 121) of the vibration transmission plate 122. Specifically, the one end of the cylindrical accommodation portion may refer to the end of the cylindrical accommodation portion away from the accommodation cavity 110, and the other end of the cylindrical accommodation portion may refer to the end of the cylindrical accommodation portion close to the accommodation cavity 110. The outer end surface of the vibration transmission plate 122 refers to the end surface departs from the accommodation cavity 110, or the end surface away from the vibration component 121. During the specific component process, each of the one or more protection components 13 may be covered on the opening 111, and the vibration transmission plate 122 may be extended into the cylindrical accommodation portion, and the outer end surface of the vibration transmission plate 122 may be fitted with the fitting portion 131. The supporting portion 133 may be connected with the other end of the ring wall portion 132, and extend towards the outside of the ring wall portion 132. The supporting portion 133 may be configured to support on the opening end of each of the shells 11. In some embodiments, the supporting portion 133 may be supported on the bearing platform 112 (such as the annular bearing platform). In some embodiments, an adhesive layer may be provided between the supporting portion 133 and the bearing platform 112 to bond the supporting portion 133 and the bearing platform 112.

Through arranging the vibration transmission plate 122 connecting the vibration component 121 extends to the outside of the accommodation cavity from the opening 111, and using the each of the protection components 13 to fit the vibration transmission plate 122, the vibration transmission plate 122 may be closer to the user's head, and the vibration of the vibration transmission plate 122 may be transmitted to the user's bone more quickly and powerfully. The mechanical vibration may be more complete and more unlikely to lose a frequency band in the embodiments of the present disclosure, thereby effectively improving an auditory effect of the hearing impaired. In addition, as each of the one or more protection components 13 has a mesh structure, air inside and outside the accommodation cavity 110 may communicate with each other in the process of the above mechanical vibration to balance a difference of air pressure inside and outside the accommodation cavity 110, thereby reducing the sound generated by the vibration of the air inside the accommodation cavity 110, attenuating the sound generated by the vibration of the air other than the sound generated by the mechanical vibration of the vibration transmission plate 122, and as a result, a sound leakage may be reduced. Compared to a structure of a sealed cavity 110, the protection component 13 may reduce an effect of the air vibration in the accommodation cavity 110 on the vibration transmission plate 122, thereby effectively improving a sound quality and a sound effect of the acoustic device 200.

In some embodiments, the acoustic device 200 may include an upper cover 14, and at least a portion of the supporting portion 133 may be clamped between the upper cover 14 and the bearing platform 112, so that the supporting portion 133 of each of the protection components 13 may be pressed on the bearing platform 112. Therefore, the supporting portion 133 may be stably supported on the bearing platform 112 to avoid a drop of each of the protection components 13. In some embodiments, the upper cover 14 may be annular.

In some embodiments, the adhesive layer may be arranged between the supporting portion 133 and the upper cover 14 to bond the supporting portion 133 and the upper cover 14.

In some embodiments, the shape of the upper cover 14 may be consistent with the shape of the bearing platform 112. For example, when the bearing platform 112 is annular, the upper cover 14 may also be annular. As another example, when the bearing platform 112 includes the plurality of protruding structures, the upper cover 14 may include a plurality of protruding platforms. When the upper cover 14 presses the second portion on the bearing platform 112, the plurality of protruding platforms may be arranged above the plurality of protruding structures in a one-to-one correspondence, or the plurality of protruding platforms and the plurality of protruding structures may be staggered.

For a position relationship between the upper cover 14, the supporting portion 133 and the bearing platform 112, there may be the following implementation modes:

In some embodiments, as shown in FIG. 3, the supporting portion 133 may be clamped between the upper cover 14 and the bearing platform 112. An outer surface (or an upper surface) of the supporting portion 133 may be close to the upper cover 14, an annular inner surface (or a lower surface) of the supporting portion 133 may be close to the bearing platform 112. As described in the present disclosure, the inner surface of the each of the protection components 13 refers to a surface fitting an end surface of the vibration transmission plate 122 away from the vibration component 121. The inner surface of the supporting portion 133 refers to the portion of the inner surface of each of the one or more protection components 13 at an annular supporting portion 133. Correspondingly, the outer surface of each of the protection components 13 may be arranged opposite to the inner surface of each of the one or more protection components 13. The outer surface of the supporting portion 133 refers to the portion of the outer surface of the each of the one or more protection components 13 at the annular supporting portion 133. In some embodiments, the upper cover 14 may directly clamp the outer surface of the supporting portion 133, and then clamp the inner surface of the supporting portion 133 on the annular bearing platform 112. In other words, the supporting portion 133 extends from an inside of a gap between the annular upper cover 14 and the bearing platform 112 to an outside of the gap. A portion of the structure in FIG. 1 is shown in FIG. 3, while the vibration component 121 is not shown in FIG. 3.

In some embodiments, an adhesive layer may be arranged between the inner surface of the supporting portion 133 and the bearing platform 112 to directly or indirectly bond the supporting portion 133 and the bearing platform 112. Further, an adhesive layer may be arranged between the outer end surface of the vibration transmission plate 122 and the fitting portion 131 to bond the vibration transmission plate 122 and the fitting portion 131. In an actual component process, the one or more protection components 13 may be directly or indirectly fixed with the vibration transmission plate 122 and one or more shells 11 through adhesive at the same time to form the above adhesive layer, and then the upper cover 14 may be covered on the supporting portion 133. Of course, there may be an adhesive layer between the outer surface of the supporting portion 133 and the upper cover 14 as well, which bonds the supporting portion 133 and the upper cover 14

Bonding the one or more protection components 13 through the embodiment described in the above FIG. 3 may simplify the structures of the one or more speakers 12 and facilitate the assembling of the one or more speakers 12. Moreover, the support of the one or more protection components 13 may be more stable as well.

In some embodiments, as shown in FIG. 6, the inner surface of the supporting portion 133 may wrap an edge portion of the upper cover 14, and the supporting portion 133 may be bent and extended to between the upper cover 14 (such as an annular cover) and the bearing platform 112 (such as the annular platform), and the outer surface of the supporting portion 133 may be close to the bearing platform 112. In some embodiments, the inner surface of the supporting portion 133 may wrap the edge portion of the upper cover 14, and then the supporting portion 133 may extend from outside to the inside through the gap between the upper cover 14 and the bearing platform 112. A portion of the structure in FIG. 1 is shown in FIG. 6, while the vibration component 121 is not shown in FIG. 6.

In some embodiments, as shown in FIGS. 5 and 6, the supporting portion 133 may include an annular sub-portion 1331 (that is, a portion of the extended portion) and a bending sub-portion 1332 (that is, a bending portion). The annular sub-portion 1331 may connect the ring wall portion 132 and extend toward the outside of the ring wall portion 132. The bending sub-portion 1332 may connect an edge of the annular sub-portion 1331 extending to the outside of the ring wall portion 132, that is, the bending sub-portion 1332 may be connected with the edge of the annular sub-portion 1331 extending to the outside of the ring wall portion 132, and may extend towards the direction away from the edge of the annular sub-portion 1331. In some embodiments, the count of the bending sub-portion 1332 may be multiple, and may respectively extend outward from the edge of the annular sub-portion 1331. The bending sub-portion 1332 may be spaced apart on the edge of the annular sub-portion 1331. In some embodiments, the bending sub-portion 1332 may further be a continuous ring which extends outward from the edge of the annular sub-portion 1331.

In some embodiments, the annular sub-portion 1331 may wrap the edge portion of the upper cover 14, and the bending sub-portion 1332 may extend from the annular sub-portion 1331 to between the upper cover 14 and the bearing platform 112. The inner surface of the supporting portion 133 may be close to the upper cover 14. In some embodiments, the inner surface of the annular sub-portion 1331 and the inner surface of the bending sub-portion 1332 may be close to the upper cover 14. The outer surface of the supporting portion 133 may be close to the bearing platform 112. Specifically, the outer surface of the bending sub-portion 1332 may be close to the bearing platform 112.

In some embodiments, an adhesive layer may be arranged between the outer surface of the supporting portion 133 and the bearing platform 112 to fix the supporting portion 133 and the bearing platform 112. An adhesive layer may further be arranged between the outer end surface of the vibration transmission plate 122 and the fitting portion 131 to fix the vibration transmission plate 122 and the fitting portion 131. In an actual component process, the one or more protection components 13 may first wrap the upper cover 14, and then be fixed with the vibration transmission plate 122 and the one or more shells 11 through the adhesive at the same time, and then the above adhesive layer may be formed. In some embodiments, an adhesive layer may be arranged between the inner surface of the supporting portion 133 and the upper cover 14 to fix the supporting portion 133 and upper cover 14.

Through the embodiment of the above FIG. 6, the one or more protection components 13 may be fixed. Compared to directly clamping the supporting portion 133 between the upper cover 14 and the bearing platform 112 as described in FIG. 3, wrapping the upper cover 14 with the inner surface of the supporting portion 133 may prevent a gap forming between the one or more protection components 13 and an inside surface of the upper cover 14 (the surface facing the accommodation cavity 110), and on the basis of effectively supporting the supporting portion 133, wrapping the upper cover 14 with the inner surface of the supporting portion 133 may further prevent a dust accumulation on the above gap, which may block the one or more protection components 13 and reduce a failure rate of the acoustic device.

In some embodiments, as shown in FIG. 4, the upper cover 14 may include a first body 141 and a second body 142 arranged in layers. The first body 141 may be closer to the bearing platform 112 (such as the annular bearing platform) than the second body 142, and the second body 142 may be supported on the bearing platform 112. The supporting portion 133 may be clamped between the first body 141 and the second body 142. In some embodiments, the inner surface of the supporting portion 133 (such as the lower surface shown in FIG. 4) may be close to the first body 141, and the outer surface of the supporting portion 133 (such as the upper surface shown in FIG. 4) may be close to the second body 142. A portion of the structure in FIG. 1 is shown in FIG. 4, while the vibration component 121 is not shown in FIG. 4.

In some embodiments, the one or more protection components 13 may form a whole with the upper cover 14 through an injection molding technology. An injection mold used in the injection molding technology may further be called as an overmolding. In some embodiments, the injection mold may include at least two sets of plastic molds. One set of the plastic mold may be used to make a harder portion, and then the formed hard portion may be put into another set of plastic mold for injection molding. Taking the one or more protection components 13 and the upper cover 14 forming a whole using the injection molding technology as an example, a material of the upper cover 14 may be a rigid plastic, whose hardness is greater than the hardness of the one or more protection components 13. The one or more protection components 13 may be formed first, then the one or more protection components 13 may be put into a mold corresponding to the upper cover 14, and then the upper cover 14 may be formed, and a structure where the first body 141 and the second body 142 clamps the supporting portion 133 of the one or more protection components 13. In some other embodiments, a connection mode between the one or more protection components 13 and the upper cover 14 may further be: an adhesive layer may be arranged between the inner surface of the supporting portion 133 and the first body 141 (apply an adhesive, which may form an adhesive layer after solidification), which bonds the supporting portion 133 and the first body 141. An adhesive layer may be arranged between the outer surface of the supporting portion 133 and the second body 142, which bonds the supporting portion 133 and the second body 142.

After the one or more protection component 13 and the upper cover 14 form a whole, an adhesive layer may be arranged between the first body 141 and the bearing platform 112 (such as the annular bearing platform), and then the first body 141 and the bearing platform 112 may be fixed. An adhesive layer may further be arranged between the outer end surface of the vibration transmission plate 122 and the fitting portion 131, thereby fixing the vibration transmission plate 122 and the fitting portion 131.

In some embodiments, the supporting portion 133 and the first body 141, and the supporting portion 133 and the second body 142 may further be connected together by clamping, threaded connection, etc.

In some embodiments, the inner surface of the supporting portion 133 (such as the annular supporting portion) may wrap an edge portion of the second body 142, and the supporting portion 133 (such as the annular supporting portion) may be bent and extended from the wrapped edge portion of the second body 142 towards the accommodation portion to between the first body 141 and the second body 142.

Through arranging the upper cover 14 to include the first body 141 and the second body 142 according to the embodiment described in FIG. 4, the first body 141 and the second body 142 may be made as a whole with the one or more protection components 13 in advance, which is convenient for later assembly with the one or more shells 11. The clamping of the first body 141 and the second body 142 (that is, the one or more protection components 13 may be clamped between the first body 141 and the second body 142, and the two surfaces of each of the one or more protection components 13 may respectively fits the first body 141 and the second body 142) may make the fixation of the one or more protection components 13 more stable.

In some embodiments, once the opening 111 is sealed, for example, each of the one or more shells 11 is entirely wrapped with a silica gel, the air within the accommodation cavity 110 may vibrate and make sound. For example, the air vibration may cause a great natural frequency resonant peak within 20 Hz to 20000 Hz when the one or more speakers 10 works, resulting in a severe sound leakage and howling, and reducing the sound effect of the one or more speakers 12.

In some embodiments, by using the one or more protection component 13 with meshes structure instead of sealing the opening 111, the air inside and outside the accommodation cavity 110 may communicate with each other, so that the resonant peak may be effectively reduced, thereby effectively reduce the sound leakage. The one or more protection components 13 of the present disclosure has a plurality of meshes which distribute in some positions of the one or more protection components 13, or the meshes may be spread throughout the entire of each of the one or more protection components 13. For example, the meshes may be arranged on the ring wall portion 132. For another example, the meshes may be arranged on the supporting portion 131, the ring wall portion 132, and the annular supporting portion 133, but as the mesh structure is dense and subtle, it is not specifically shown in FIG. 2-FIG. 8.

In some embodiments, a mesh count of each of the one or more protection components 13 may be 250-600. In some embodiments, the mesh count of each of the one or more protection components 13 may be 300-500. In some embodiments, the mesh count of each of the one or more protection components 13 may be 380-480. the mesh count of each of the one or more protection components 13 may be 400-430. In some embodiments, a thickness of each of the one or more protection components 13 may be 0.01 mm-0.3 mm. In some embodiments, the thickness of each of the one or more protection components 13 may be 0.05 mm-0.25 mm. In some embodiments, the thickness of each of the one or more protection components 13 may be 0.1 mm-0.2 mm. In some embodiments, the thickness of each of the one or more protection components 13 may be 0.125 mm-0.15 mm. The designs of the mesh count and thickness of each of the one or more protection components 13 may more effectively reduce the sound leakage and ensure an intensity of each of the one or more protection components 13.

In some embodiments, a material of the one or more protection components 13 may be at least one of PC (polycarbonate), PET (polyethylene glycol terephthalate), and nylon. In some embodiments, the material of one or more protection components 13 may be a metal material or an alloy material, such as steel and aluminum. In some embodiments, the material of one or more protection components 13 may be a fiber material, such as carbon fiber, glass fiber, etc.

In some embodiments, the one or more protection components 13 may be shaped through thermoforming, which makes one or more protection components 13 form a structure that includes the supporting portion 131, the ring wall portion 132, and the annular supporting portion 133. Specifically, the following embodiment may be used to improve a yield and a structural stability of the one or more protection components 13.

In some embodiments, the one or more protection components 13 may be made through 3D printing.

The beneficial effects of the present disclosure include: the present disclosure applies the bone conduction technology to the hearing aid device, which may solve the problem of a limited improvement on an auditory effect of the hearing impaired using a traditional hearing aid. Moreover, through arranging the vibration transmission plate 122 to extend out of the accommodation cavity 110 through the opening 111, and fitting the one or more protection component 13 with the transmission plate 122, the vibration transmission plate 122 may be directly closer to the user's head, and the vibration of the vibration transmission plate 122 extended out of the accommodation cavity 110 may be transmitted to the user's bones more quickly and powerfully, which in turn makes the transmission of the mechanical vibration more complete and more unlikely to lose the frequency band, thereby effectively improving an auditory effect of the hearing impaired. Moreover, due to the mesh structure of the one or more protection components 13, the air inside and outside the accommodation cavity 110 may communicate with each other, thereby reducing the sound caused by the air vibration in the accommodation cavity 110, attenuating the sound generated from the air vibration apart from the mechanical vibration, and the sound leakage may be effectively reduced. In addition, compared with a sealed structure of the accommodation cavity 110, the one or more protection components 13 with the mesh structure may further reduce the impact of the air vibration on the mechanical vibration of the vibration transmission plate 122 in the accommodation cavity 110, and the sound quality and the hearing aid effect of the acoustic device 200 may be effectively improved.

The present disclosure further provides a production method for preparing the protection component of the acoustic device. The method may include the following operations.

In S1, a combination may be formed by fitting the mesh structure (e.g., a gauze element) and a lining material, wherein a hardness of the lining material is greater than a hardness of the mesh structure.

In S2, a shaped combination may be obtained by shaping the combination using a molding technique. In some embodiments, the molding technology may include a thermoforming technology, a stamping technology, a 3D printing molding, etc. In some embodiments, the combination may be formed by thermoforming. In some other embodiments, the combination may be formed by thermoforming first, and then stamped. In some other embodiments, the combination may be formed by stamping first, and then thermoformed.

In S3, the one or more protection components may be obtained based on the shaped combination. The shaped combination in S3 may be the combination formed by stamping and then thermoforming, and it may further be the combination formed by thermoforming and then stamping, or it may be the combination formed by direct thermoforming. After separating the lining material and the mesh structure of the shaped combination, a shaped mesh structure (that is, the one or more protection components) may be obtained. The shaped mesh structure may constitute each of the one or more protection components with a first portion and a second portion. The first and second portions may form a cylindrical structure. At least a portion of the second portion may form a cylinder wall of the cylindrical structure (e.g., an annular wall, that is, a ring wall, for example, the ring wall portion 132 in FIG. 3); and the first portion may form a bottom wall of the cylindrical structure (e.g., the fitting portion 131 in FIG. 3). The first and second portions may form the accommodation cavity. In some embodiments, the first portion may be roughly perpendicular to the second portion. In some embodiments, the second portion may include the cylinder wall of the cylindrical structure and a side portion extended in the direction roughly perpendicular to the cylinder wall (e.g., the supporting portion 133 in FIG. 3). In some embodiments, the mesh structure may be further processed according to use requirements of the one or more protection components, such as adding slots or threaded holes on the mesh structure.

In some embodiments, the thermoforming may be directly performed on the mesh, so that the mesh may form each of the one or more protection components with the first portion and the second portion.

Figure 7:
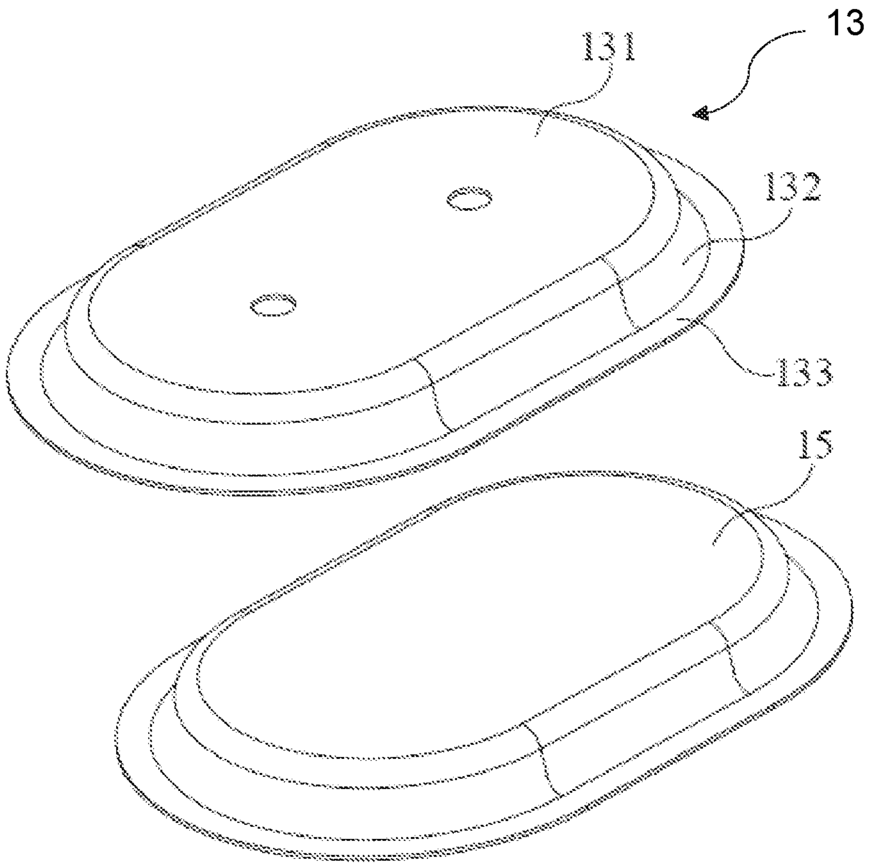
FIG. 7 is a schematic diagram illustrating a disassembled structure of a mesh component according to some embodiments of the present disclosure.
Figure 8:
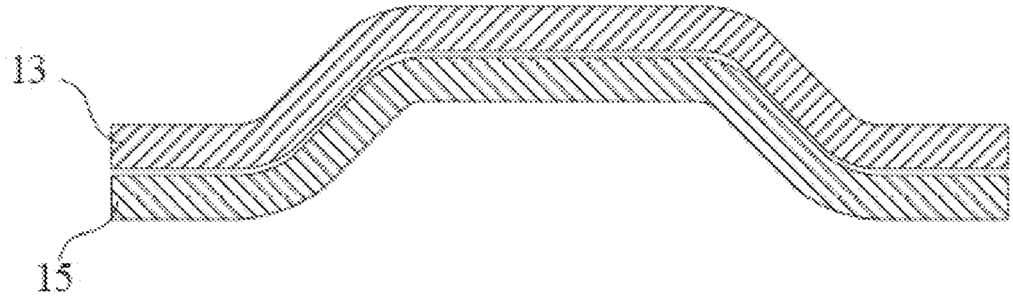
FIG. 8 is a structural schematic diagram illustrating a cross section of a fitted mesh component according to some embodiments of the present disclosure.

The present disclosure further provides a mesh component, which may be applied to the speaker of the acoustic device in the above disclosure. FIG. 7 is a schematic diagram illustrating a disassembled structure of a mesh component according to some embodiments of the present disclosure. FIG. 8 is a structural schematic diagram illustrating a cross section of a fitted mesh component according to some embodiments of the present disclosure. FIG. 0.9 is a schematic diagram illustrating a preparation flow of the mesh component according to some embodiments of the present disclosure. As shown in FIG. 7, the mesh component of the embodiment may include the one or more protection components 13 and the lining material 15 fitted with each other.

Figure 9:
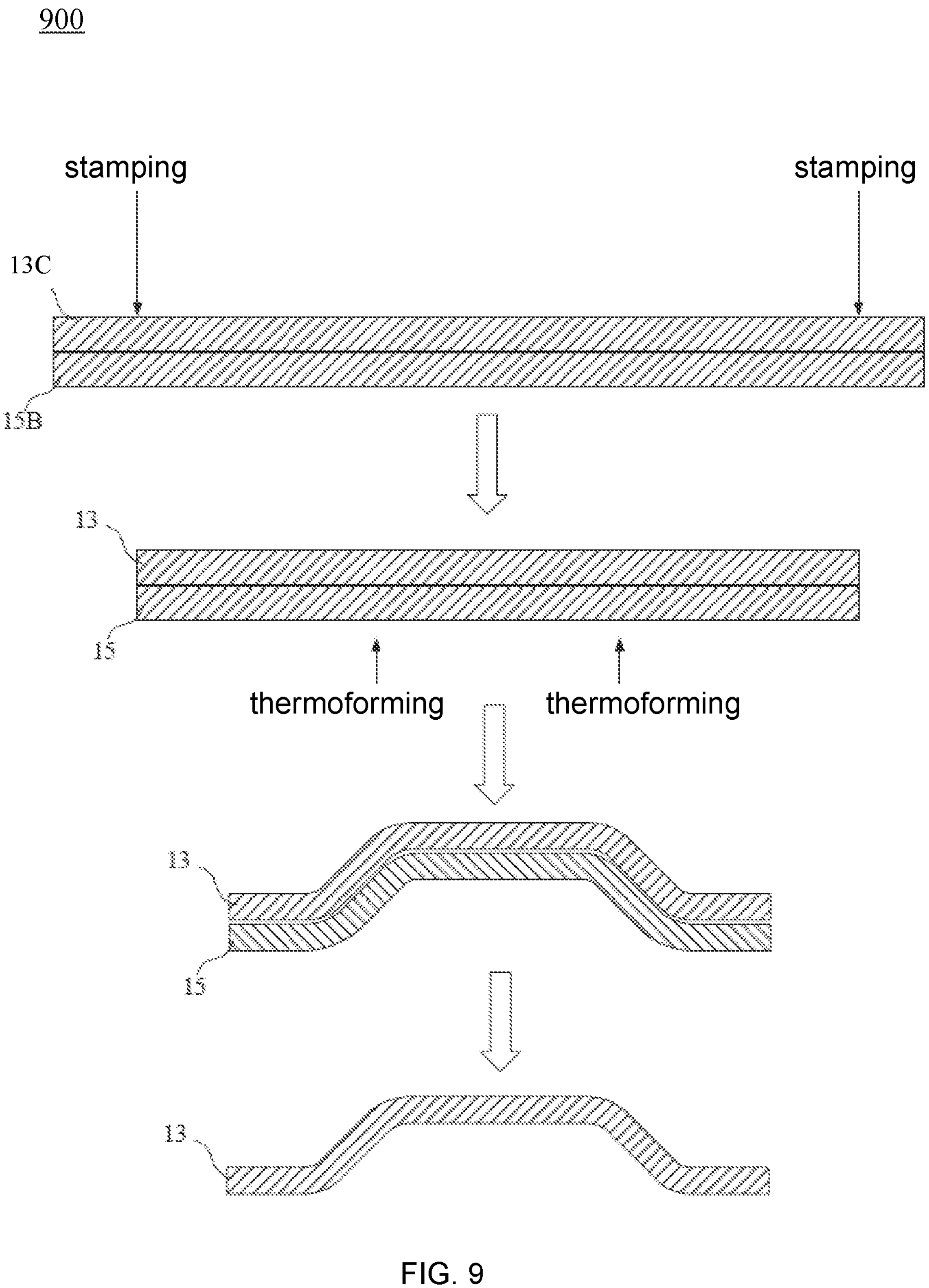
FIG. 9 is a flowchart illustrating a preparation process of the mesh component according to some embodiments of the present disclosure.

In some embodiments, as shown in FIG. 7 to FIG. 9, the one or more protection components 13 (which may refer to a shaped mesh) and the lining material 15 (which may refer to a shaped lining material) may obtain corresponding structures after performing thermoforming on the mesh and the lining material. For example, the one or more protection components 13 (which may refer to the shaped mesh) may include the fitting portion 131, the ring wall portion 132, and the supporting portion 133. The fitting portion 131 may be used to seal one end of the ring wall portion 132, the supporting portion 133 may be connected with the other end of the ring wall portion 132, and extend toward the outside of the ring wall portion 132. The hardness of the lining material 15 may be greater than the hardness of the one or more protection components 13, and the lining material 15 and the one or more protection components 13 may have the same shape after shaped, thereby supporting the one or more protection components 13 to keep its shape after thermoforming. In some embodiments, the material of the lining material 15 may be plastic.

In some embodiments, as the hardness of the lining material 15 is greater than the hardness of the one or more protection components 13, when the one or more protection components 13 and the lining material 15 are shaped together through thermoforming, the lining material 15 and the one or more protection components 13 may deform to the corresponding shape together. At this time, the two may be conformal, and the lining material 15 may support the one or more protection components 13 to maintain the corresponding shape. During assembly, the one or more protection component 13 may be assembled to the one or more shells 11.

Figure 10:
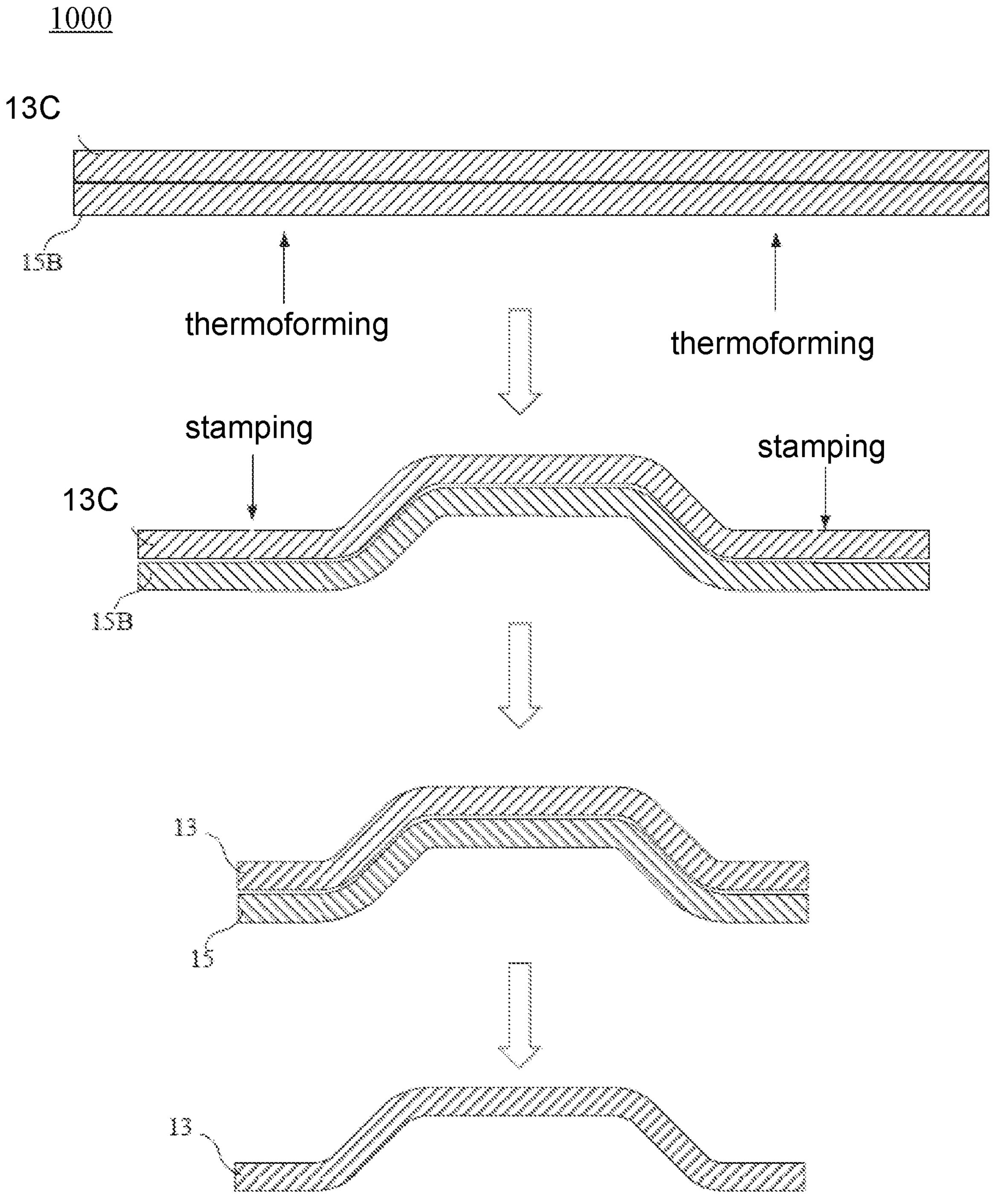
FIG. 10 is a flowchart illustrating another preparation process of the mesh component according to some embodiments of the present disclosure.

The specific method for the preparation using the above solution of the embodiment to form the one or more protection components 13 may refer to the detailed descriptions of FIG. 9 and FIG. 10.

FIG. 9 is a flowchart illustrating a preparation process of the mesh component according to some embodiments of the present disclosure.

As shown in FIG. 9, a process 900 may include the following operations.

In S11: an original mesh 13C and an original lining material 15B may be prepared and fitted;

S12: stamping may be performed on the fitted original mesh 13C and the original lining material 15B, and obtaining one or more protection components 13 and the lining material 15 of a predetermined size;

S13: after fitting the one or more protection components 13 and the lining material 15, the thermoforming may be performed, the lining material 15 and the one or more protection components 13 may be conformal so that the lining material 15 may support the one or more protection components 13 to keep its shape after thermoforming. Each of the one or more protection components 13 after thermoforming may include the fitting portion 131, the ring wall portion 132, and the supporting portion 133. The fitting portion 131 may be used to seal one end of the ring wall portion 132, the supporting portion 133 may be connected with the other end of the ring wall portion 132, and extend toward the outside of the ring wall portion 132;

S14: the lining material 15 may be stripped, and the one or more protection components 13 may be obtained.

FIG. 10 is a flowchart illustrating another preparation process of the mesh component according to some embodiments of the present disclosure.

As shown in FIG. 10, a process 1000 may include the following operations.

In S21: an original mesh 13C and an original lining material 15B may be prepared.

S22: thermoforming may be performed on the fitted original mesh 13C and the original lining material 15B. The lining material 15 and the one or more protection components 13 may be conformal so that the lining material 15 may support the one or more protection components 13 to keep the shape after thermoforming.

S23: stamping may be performed on the original mesh 13C and the original lining material 15B after the thermoforming, and obtaining the conformal one or more protection components 13 and the lining material 15. The one or more protection components 13 may include the fitting portion 131, the ring wall portion 132, and the supporting portion 133. The fitting portion 131 may be used to seal one end of the ring wall portion 132, the supporting portion 133 may be connected with the other end of the ring wall portion 132, and extend toward the outside of the ring wall portion 132;

S24: the lining material 15 may be stripped, and the one or more protection components 13 may be obtained.

The embodiment uses the lining material 15 to assist the one or more protection components 13 to perform thermoforming. As the hardness of the lining material 15 is greater than the hardness of the one or more protection components 13, after the thermoforming, the lining material 15 may support the one or more protection components 13 to keep its shape, thereby obtaining the one or more protection components 13 with a stable shape and structure, improving the yield and structural stability of the one or more protection components 13, and facilitating the subsequent assembly to the corresponding one or more shells 11. In addition, as the one or more protection components 13 can effectively maintain its shape after thermoforming, it may fit the structures and shapes of the one or more speakers 12, and may effectively fit the outer end surface of the vibration transmission plate 122. The stable mesh structure of each of the one or more protection components 13 may enable the communication of the air inside and outside the accommodation cavity 110, thereby reducing the sound caused by the air vibration in the accommodation cavity 110, attenuating the sound generated from the air vibration apart from the mechanical vibration, and the sound leakage may be effectively reduced. Compared with the sealing structure of the accommodation cavity 110, the one or more protection components 13 may reduce the sound leakage of the speaker components 10.

The mesh component of the embodiment may improve the structural stability of the one or more protection components 13 and helps to improve the hearing aid effect of the acoustic device 200.

Figure 11:
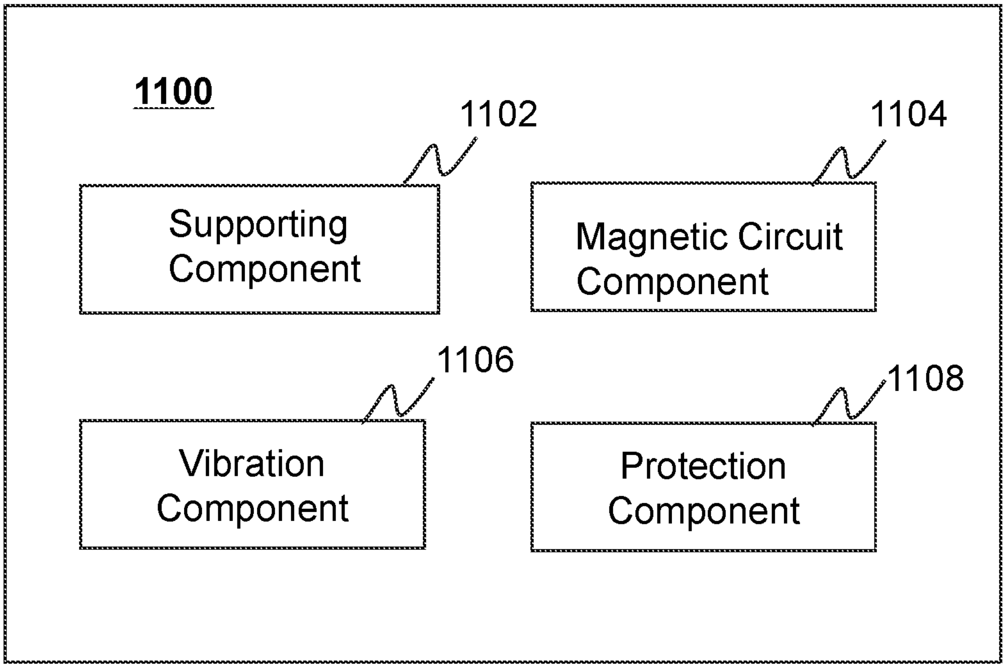
FIG. 11 is a schematic diagram illustrating an acoustic device according to some embodiments of the present disclosure.

FIG. 11 is a schematic diagram illustrating an acoustic device according to some embodiments of the present disclosure. As shown in FIG. 11, an acoustic device 1100 (e.g., a bone conduction speaker, a bone conduction headset, etc.) may include a supporting component 1102, a magnetic circuit component 1104, a vibration component 1106, and one or more protection components 1108.

The supporting component 1102 may support the magnetic circuit component 1104, the vibration component 1106 and/or the one or more protection components 1108. The supporting component 1102 may include one or more shells, one or more connectors, etc. The one or more shells may form an accommodation cavity to accommodate at least the magnetic circuit component 1104 and the vibration component 1106, and the one or more shells may be used to install the one or more protection components 1108. The one or more connectors may connect the one or more shells and the magnetic circuit component 1104, and the connectors may further connect the vibration component 1106 and the one or more protection components 1108. In some embodiments, the one or more shells may have openings. In some embodiments, the openings may be used to balance the changes of an air pressure in the accommodation cavity in a vibration process of the vibration component 1106. In some embodiments, the openings may be used to install the magnetic circuit component 1104 and/or the vibration component 1106 in the accommodation cavity.

In some embodiments, the supporting component 1102 may include a bearing platform, and the bearing platform may be arranged on the one or more shells. The bearing platform may be used to support the one or more protection components 1108. In some embodiments, the bearing platform may be annular. In some embodiments, the supporting component 1102 may include an upper cover, and the upper cover and the bearing platform may be used to clamp the protection component 1108, so that the one or more protection components 1108 may be stably fixed on the supporting component 1102. In some embodiments, the upper cover may be annular. In some embodiments, the upper cover may include a first body and a second body arranged in layers. The first body and the second body may be used to clamp the one or more protection components 1108. In some embodiments, the first body and the second body may be annular.

The magnetic circuit component 1104 may provide a magnetic field. The magnetic field may be used to convert a signal containing sound information into a vibration signal. In some embodiments, the sound information may include a video or an audio file with specific data format, or data or a file that may be converted into a sound through a specific channel.

The vibration component 1106 may produce a mechanical vibration. A generation of the vibration is accompanied by the convert of energy, the acoustic device may use the specific magnetic circuit component 1104 and the vibration component 1106 to realize a conversion from a signal containing sound information to the mechanical vibration. The conversion process may contain a coexistence and conversion of a variety of different types of energy. For example, in the present disclosure, an electrical signal may be directly converted into the mechanical vibration through a transducer to generate the sound. In some embodiments, the vibration component 1106 may convert an audio signal (e.g., the electrical signal) into a mechanical vibration signal under the action of the magnetic field, and transmit the mechanical vibration signal through a wearer's skin, bone, etc. to the auditory center so that the wearer can hear the sound. In some embodiments, the vibration component 1106 may include a voice coil, a vibrating plate, and a vibration transmission plate. The voice coil may be placed in a magnetic gap formed by the magnetic circuit component 1104. The voice coil may vibrate under the action of the magnetic field after the electrical signal (i.e., the audio signal) passes, the voice coil may be physically connected with the vibrating plate to pass the vibration to the vibrating plate. The vibration transmission plate may be physically connected with the vibrating plate so that the vibration generated by the vibration component 1106 may be passed to the human bone. As described in the present disclosure, the magnetic circuit component 1104 and the vibration component 1106 may be called a transducer or a speaker. In some embodiments, the vibration component 1106 may include the magnetic circuit component 1104. In some embodiments, the acoustic device 1100 may realize the conversion from the audio signal to the mechanical signal through other component.

The one or more protection components 1108 may be used to prevent a foreign object (such as dust, dandruff, etc.) from entering the inside of the one or more shells through the opening on the shells. The one or more protection components 1108 may protect the magnetic circuit component 1104 and the vibration component 1106 to extend a service life of acoustic device. At least portion of the protection component 1108 and the vibration component 1106 may be physically connected to transmit the vibration of the vibration component 1106 to the outside world. The protection component 1108 includes a mesh structure with meshes to make the accommodation cavity communicate with the outside world. In some embodiments, the one or more protection components 1108 may include a first portion and a second portion, and the second portion may be connected with the first portion. The first and second portions may form an accommodation portion, the accommodation portion may be used to accommodate at least a portion of the vibration component 1106. For example, the vibration transmission plate may be located in the accommodation portion and the first portion may fit an end surface of the vibration transmission plate away from the vibration component 1106, that is, the first portion may be used to seal one end of the accommodation portion, and the first portion may fit the end surface of the vibration component 1106 (e.g., the vibration transmission plate) facing the opening. The shape of the accommodation portion varies. For example, the shape may be a sphere, a cylinder, an elliptic cylinder, a cone, or other irregular shapes, etc. In some embodiments, the second portion may be physically connected with the one or more shells at the end with openings. In some embodiments, the second portion may be connected with the one or more shells at the ends with openings through clamping, bonding, welding, and threading, etc. In some embodiments, the one or more protection components 1108 may include the mesh structure with meshes, and the meshes may allow the air inside and outside the accommodation cavity to communicate with each other, so that the accommodation cavity may communicate with the outside world. In some embodiments, the one or more protection components 1108 may be physically connected with the one or more shells at the ends with openings.

In some embodiments, at least portion of the outer surface of the second portion may fit the upper cover, and at least portion of the inner surface of the second portion may fit the bearing platform to clamp the second portion between the upper cover and the bearing platform.

In some embodiments, the second portion of each of the one or more protection components 1108 includes a ring wall portion (e.g., the ring wall portion 132 in FIGS. 3-7) and a supporting portion (e.g., the supporting portion 133 in FIG. 3). The ring wall portion may be connected with the first portion, and may extend towards the vibration component 1106, and the supporting port may be connected with an edge of the ring wall portion away from the first portion. The supporting portion may extend from an extension portion to between the upper cover and the bearing platform, or between the first body and the second body. In some embodiments, the ring wall, the support portion, and the first portion may be connected by bonding, clamping, etc. In some other embodiments, the ring wall portion, a bending portion, and the first portion may form a whole to make each of the one or more protection components 1108 an integrated structure.

In some embodiments, the supporting portion of the second portion of each of the one or more protection components 1108 (e.g., the supporting portion 133 in FIG. 6) may include a first sub-portion (e.g., the annular sub-portion 1331 in FIG. 6) and a second sub-portion (e.g., the bending sub-portion 1332 in FIG. 6). The first sub-portion may be roughly perpendicular to the second sub-portion. The first sub-portion and the second sub-portion may wrap an edge area or an entire area of the upper cover (e.g., the annular cover). The first sub-portion and the second sub-portion may be clamped between the upper cover and a convex.

In some embodiments, when the upper cover includes the first body and the second body, the at least portion of the second portion may be clamped between the first body and the second body. In other words, the two opposite sides of the second portion may respectively touch the first body and the second body.

More descriptions of the one or more protection components 1108 may be referred to in the descriptions of other portions of the present disclosure (e.g., FIGS. 2-7 and the detailed descriptions).

The above are merely the embodiments of the present disclosure, and are not intended to limit the patent scope of the present disclosure. Any equivalent structure or equivalent process transformation made by using the content of the present disclosure and the attached drawings, or the directly or indirectly use of the present disclosure in other related technology fields shall be included in the patent protection scope of the present disclosure.

The above is merely part of the embodiments of the present disclosure, and are not intended to limit the patent scope of the present disclosure. Any equivalent structure or equivalent process transformation made by using the content of the present disclosure and the attached drawings, or the directly or indirectly use of the present disclosure in other related technology fields shall be included in the patent protection scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic device, comprising:

one or more shells each of which includes an accommodation cavity and an opening;

one or more speakers each of which includes a vibration component and a vibration transmission plate; the vibration transmission plate is connected with the vibration component, wherein the vibration component is accommodated in the accommodation cavity; and one or more protection components configured to prevent a foreign body from entering the accommodation cavity through the opening, wherein at least a portion of one of the one or more protection components is physically connected with the vibration component to transmit a vibration of the vibration component to the outside; wherein at least one of the one or more protection components includes a first portion and a second portion, the first portion and the second portion form an accommodation portion, at least a portion of the vibration component is arranged in the accommodation portion; the first portion is configured to seal one end of the accommodation portion, and the first portion fits and contacts the vibration transmission plate.

2. The acoustic device of claim 1, wherein at least a portion of the vibration component extends out of the accommodation cavity through the opening.

3. The acoustic device of claim 1, wherein at least one of the one or more protection components includes a mesh structure with one or more meshes to make the accommodation cavity communicate with the outside.

4. The acoustic device of claim 1, wherein the second portion is physically connected with an end of one of the one or more shells with the opening.

5. The acoustic device of claim 1, wherein an inner wall of one of the one or more shells is arranged with a bearing platform, and the second portion is supported on the bearing platform.

6. The acoustic device of claim 5, wherein the acoustic device further includes an upper cover, and at least a portion of the second portion is clamped between the upper cover and the bearing platform to press the second portion on the bearing platform.

7. The acoustic device of claim 6, wherein the one or more protection components form a whole with the upper cover through an injection molding technology.

8. The acoustic device of claim 6, wherein at least a portion of an outer surface of the second portion fits the upper cover, and at least a portion of an inner surface of the second portion fits the bearing platform.

9. The acoustic device of claim 6, wherein the second portion includes a ring wall portion and a supporting portion, the ring wall portion connects the first portion and extends toward the vibration component; the supporting portion extends from the ring wall portion to between the upper cover and the bearing platform.

10. The acoustic device of claim 9, wherein the supporting portion includes an annular sub-portion and a bending sub-portion, the annular sub-portion connects the ring wall portion and extends toward the outside of the ring wall portion, and the bending sub-portion connects an edge of the annular sub-portion extending to the outside of the ring wall portion.

11. The acoustic device of claim 10, wherein the annular sub-portion wraps an edge portion of the upper cover, and the bending sub-portion extends from the annular sub-portion to between the upper cover and the bearing platform.

12. The acoustic device of claim 10, wherein an adhesive layer is arranged between an outer surface of the supporting portion and the bearing platform to fix the supporting portion and the bearing platform.

13. The acoustic device of claim 6, wherein, the upper cover includes a first body and a second body arranged in layers, and at least a portion of the second portion is clamped between the first body and the second body.

14. The acoustic device of claim 1, wherein one of the one or more protection components includes a mesh structure with meshes, and a mesh number of the mesh structure is 250-600.

15. The acoustic device of claim 1, wherein one of the one or more protection components includes a mesh structure with meshes, and a thickness of the mesh structure is 0.01 mm-0.3 mm.

16. The acoustic device of claim 1, wherein a count of the one or more shells, a count of the one or more speakers, and a count of the one or more protection components are two, each of the one or more shells corresponds to one of the one or more speakers and one of the one or more protection components;

the acoustic device further includes two ear hook components and a rear hook component, the two ear hook components respectively connect with the two shells; and the rear hook component is connected between the two ear hook components.

17. The acoustic device of claim 16, wherein the acoustic device includes a pickup component used to obtain a sound signal; and the pickup component is arranged on at least one of the one or more speakers, the two ear hook components, and the rear hook component.

18. The acoustic device of claim 1, wherein the one or more protection components are arranged at the opening of each of the one or more shells and fit and contact the vibration transmission plate.

19. The acoustic device of claim 1, wherein the acoustic device further includes an upper cover, and an inner wall of one of the one or more shells is arranged with a bearing platform;

wherein the second portion includes a ring wall portion and a supporting portion, the ring wall portion connects the first portion, the supporting portion includes an annular sub-portion wrapping an edge portion of the upper cover, and an bending sub-portion extending from the annular sub-portion to between the upper cover and the bearing platform.

20. A method for preparing one or more protection components of an acoustic device, comprising:

forming a combination by fitting a mesh structure and a lining material, wherein a hardness of the lining material is greater than a hardness of the mesh structure;

obtaining a shaped combination by shaping the combination using a molding technique; and obtaining, based on the shaped combination, the one or more protection components of the acoustic device including one or more shells each of which includes an accommodation cavity and an opening;

one or more speakers each of which includes a vibration component accommodated in the accommodation cavity; wherein the one or more protection components are configured to prevent a foreign body from entering the accommodation cavity through the opening, wherein at least a portion of one of the one or more protection components is physically connected with the vibration component to transmit a vibration of the vibration component to the outside.

* * * * *